United States Patent
Deng et al.

(10) Patent No.: US 10,848,087 B2
(45) Date of Patent: Nov. 24, 2020

(54) CONTROL ARRANGMENT FOR A GENERATOR

(71) Applicant: SIEMENS GAMESA RENEWABLE ENERGY A/S, Brande (DK)

(72) Inventors: Heng Deng, Ikast (DK); Nuno Miguel Amaral Friere, Brande (DK); Zhan-Yuan Wu, Sheffield (GB)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/333,732

(22) PCT Filed: Sep. 1, 2017

(86) PCT No.: PCT/EP2017/071986
§ 371 (c)(1),
(2) Date: Mar. 15, 2019

(87) PCT Pub. No.: WO2018/050458
PCT Pub. Date: Mar. 22, 2018

(65) Prior Publication Data
US 2019/0273457 A1  Sep. 5, 2019

(30) Foreign Application Priority Data

Sep. 19, 2016  (DE) .......................... 10 2016 217 887

(51) Int. Cl.
*H02P 21/00* (2016.01)
*H02P 21/05* (2006.01)
(Continued)

(52) U.S. Cl.
CPC ............ *H02P 21/05* (2013.01); *F03D 7/0272* (2013.01); *F03D 9/25* (2016.05); *H02P 9/102* (2013.01);
(Continued)

(58) Field of Classification Search
CPC .... H02P 21/22; H02P 2101/15; H02P 21/141; H02P 21/26; H02P 23/14
See application file for complete search history.

(56) References Cited

U.S. PATENT DOCUMENTS 6,426,605 B1  7/2002 Toliyat et al.
2002/0097015 A1  7/2002 Kitajima et al.
(Continued)

FOREIGN PATENT DOCUMENTS

EP  2672624 A1  12/2013
EP  3264593 A1  1/2018

OTHER PUBLICATIONS

International Search Report for application No. PCT/EP2017/071986 dated Dec. 5, 2017.
(Continued)

*Primary Examiner* — Karen Masih
(74) *Attorney, Agent, or Firm* — Schmeiser, Olsen & Watts LLP

(57) ABSTRACT

Provided is a control arrangement for controlling an electrical machine, including: a fundamental current controller, at least one harmonic flux controller related to a harmonic of an electrical frequency of the electrical machine, a summation system for adding voltage commands to obtain a summed voltage command based on which the electrical machine.

15 Claims, 9 Drawing Sheets

(51) Int. Cl.
    *H02P 21/22*     (2016.01)
    *F03D 9/25*     (2016.01)
    *F03D 7/02*     (2006.01)
    *H02P 9/10*     (2006.01)
    *H02P 21/14*     (2016.01)
    *H02P 25/22*     (2006.01)
    *H02P 29/50*     (2016.01)
    *H02P 101/15*     (2016.01)

(52) U.S. Cl.
    CPC ............ *H02P 21/141* (2013.01); *H02P 21/22* (2016.02); *H02P 25/22* (2013.01); *H02P 29/50* (2016.02); *F05B 2220/706* (2013.01); *F05B 2270/10* (2013.01); *F05B 2270/20* (2013.01); *F05B 2270/30* (2013.01); *H02P 2101/15* (2015.01)

(56) References Cited

U.S. PATENT DOCUMENTS

| | | |
|---|---|---|
| 2006/0038531 A1 | 2/2006 | Wakabayashi et al. |
| 2006/0132082 A1 | 6/2006 | Ihm et al. |
| 2011/0224957 A1 | 9/2011 | Ransom |
| 2020/0036311 A1* | 1/2020 | Freire ................. H02P 21/0017 |

OTHER PUBLICATIONS

Non-English German Office Action for application No. 10 2016 217 887.3 dated May 24, 2018.

* cited by examiner

CONTROL ARRANGMENT FOR A GENERATOR

CROSS-REFERENCE TO RELATED APPLICATIONS

This application claims priority to PCT Application No. PCT/EP2017/071986, having a filing date of Sep. 1, 2017, which is based on German Application No. 10 2016 217 887.3, having a filing date of Sep. 19, 2016, the entire contents both of which are hereby incorporated by reference.

FIELD OF TECHNOLOGY

The following relate to a control arrangement for controlling an electrical machine, and to a generator system and a wind turbine.

BACKGROUND

In a wind turbine, a rotation shaft at which plural rotor blades are connected drives a generator in order to generate electric energy. Conventionally, a converter, in particular full scale frequency converter, is connected to output terminals of the generator. The frequency converter is widely used to interface the generator to a utility grid to which plural consumers of electricity are connected.

When a multiple-channel three-phase PM machine is designed, the electromagnetic circuit is usually symmetrical and balanced. However, such a machine could become less electromagnetically balanced when operated with reduced number of channels, for example, the single channel (three-phase) operation. This is particularly the case for a machine with segmented stator or rotor. In this operation mode, there can be more harmonic content in the electrical and electromagnetic signals. In particular, the harmonics in the airgap flux linkage will induce more losses in the rotor magnet and thus potential overheating and demagnetisation of the magnets, which becomes one of the key limiting factors in power production.

For a PM machine, the d- and q-axis flux linkages can be described as, $$\begin{cases} \psi_d = L_d I_d + \psi_{pm} \\ \psi_q = L_q I_q \end{cases} \quad (1)$$

Here, $L_d$ and $L_q$ are respectively the equivalent inductance on the d and q axis, and $\psi_{pm}$ is the flux linkage produced from the permanent magnet, which can be assumed constant for investigation concerned here.

When the machine is in full channel operation, it will be electromagnetically balanced, and the d and q inductances will contain hardly any harmonics. Under control with constant Id and Iq currents, the flux linkages will be harmonic free. However, when the machine is operated with reduced number of channels, there will be some harmonics in the d and q inductances.

Thus, there may be a need for a control arrangement for controlling an electrical machine, for a generator system and for a wind turbine, where harmonics are reduced and the system can be operated at higher efficiency.

The need is met by the subject-matter of the independent claim. The dependent claims specify particular embodiments of the present invention.

SUMMARY

The embodiments of the invention may provide a control method to minimize the harmonic losses in the rotor magnet of a multiple channel three-phase machine, when it is run in reduced channel operation where there is a large unbalance in electromagnetic circuit. This may prevent the magnet from over-heating and thus demagnetization, and also increase the machine output power.

According to an embodiment of the present invention, there is provided a control arrangement for controlling an electrical machine, in particular generator, having plural stator windings separately connectable to a converter, the control arrangement comprising: a fundamental current controller, including: a positive-sequence current controller configured for providing a first voltage command, in particular in a dq+ frame, based on plural stator currents of the plural stator windings; the control arrangement further comprising: at least one harmonic flux controller related to a harmonic of an electrical frequency of the electrical machine, wherein the harmonic flux controller is configured to receive as inputs a flux linkage signal related to flux linkages generated by the plural stator windings, a reference flux linkage signal related to reference flux linkage of a particular order to be generated by the plural stator windings and an electrical angle of the electrical machine, wherein the harmonic flux controller is configured to output an reference harmonic current command, in particular a d-component of a reference harmonic current, based on the harmonic flux controller inputs, wherein based on the reference harmonic current command a reference harmonic voltage command is derivable; and a summation system for adding, in particular separately for a respective d-component and a respective q-component, the first voltage command and the reference harmonic voltage command to obtain a summed voltage command based on which the electrical machine, in particular the converter, is controllable.

The electrical machine may be in particular a variable frequency AC electrical machine, such as an electromotor or a generator, in particular a generator of a wind turbine. The generator may for example be a synchronous generator, in particular having a rotor with permanent magnets rotating around a stator, in particular comprising two or more stator windings for different phases, such as three phases, and the plural stator currents flow through the plural stator windings. The generator may be an inner rotor generators or outer rotor generators.

The stator may form a full circumference or may be a segmented stator comprising several (physically separated) stator segments. The generator can have multiple electrical-isolated three-phase windings (power output) even though the stator is not a segmented stator.

The control arrangement may be a component in a sequence of modules which finally control the converter for the plural stator windings. The number of the plural converters may equal the number of the one or more sets of stator windings each stator windings providing for e.g. three different phases. The one or more sets of plural windings supply the electric power flow to the converter(s) during a normal operation of the generator, such as a wind turbine generator. The plural windings (in particular of each set of windings) may for example correspond to three phases or 6 (or more) phases.

Thus, the electrical machine may comprise two, three or even more sets of stator windings, each set of stator windings for example providing three phases or six phases or still more phases having a same number of windings as phases.

When the electrical machine has multiple sets of stator windings, this electrical machine is also referred to as multi-channel electrical machine. For different reasons, one or more of the multiple sets of stator windings may be idle or disconnected from their converters, for example due to a failure in the corresponding converters. In particular, in this situation, some harmonics in the electrical quantities, such as harmonics in the output voltage, harmonics in the flux linkages or harmonics in the inductances may be observed which may be caused by coupling of the different sets of stator windings.

In the situation, where one or more of the sets of stator windings is idle, the remaining (operating) sets of stator windings may be controlled according to embodiments of the present invention. Thus, the reference harmonic voltage command will be used to control the one or more remaining sets of stator windings, in particular by providing the reference harmonic voltage command to a respective converter (each set of stator windings may have a converter associated and connected thereto).

In particular, the electrical machine may have exactly two sets of stator windings. When one set of stator windings is idle (non-operating), the reference harmonic voltage command may be supplied to a converter which is connected to the operating set of stator windings. When there are more than one remaining operating sets of stator windings, the derived reference harmonic voltage command may be divided between those converters which are connected to the remaining operating sets of stator windings. The division may be performed in a number of different ways with an aim that the ripple in the flux linkage of interest will be minimised, and thus the magnet harmonic losses will be reduced. For example, in the case of a triple-channel three phase generator (having three sets of three phase stator windings), if one channel (one of the three sets of three phase stator windings) is idle (out of function), the other two active channels could share equally and control the required d-axis harmonic current, or all the d-axis harmonic current control could be handled by a single active channel.

The plural stator currents may for example be represented by three phase currents, such as $I_a$, $I_b$ and $I_c$ (in particular for each of the remaining sets of windings) The currents contain both positive-sequence component and negative-sequence component, at certain frequencies. While the positive-sequence component may be interpreted as a vector rotating in an anti-clockwise manner, the negative-sequence may be interpreted as a vector rotating in a clockwise manner. According to this embodiment of the present invention the positive sequence component and negative-sequence component are separately controlled. In particular, with the negative-sequence component a degree of unbalance of the plural stator currents is obtained and the unbalance is reduced, when the converter is controlled based on the summed voltage command.

The control arrangement performs a method for controlling the plural stator currents of the electrical AC machine. The control arrangement and the method performed by the control arrangement may be preferably used in variable speed wind turbines. However, it may be possible to use the method and the current control for other applications like motor drives and electrical cars.

The dq-frame is a particular frame or coordinate system to represent in particular three phase circuits or currents. Thereby, the three AC quantities, such as three phase currents, are transformed to two (or three, if a dq0 frame is considered) quantities, which may be pure DC quantities if the three phase currents are balanced. In order to obtain the quantities in the dq-frame a 3×3 (or 2×3) transformation matrix is applied to the three phase currents. Thereby, the d-axis is perpendicular to the q-axis and the dq-frame rotates with the frequency of the three phase currents according to the first order in an anti-clockwise manner. Thus, the voltage command may comprise two (or three) components in the dq-frame. By the transformation, the three phase current $I_a$, $I_b$, $I_c$ are transformed into the quantities $I_d$, $I_q$.

The fundamental current controller may be configured and adapted as described in the European patent EP 2 672 624. The harmonics of the electrical machine, in particular a generator, voltage in a dq frame may be changed by adjusting the harmonic Id and Iq (d-component and q-component of the generator current flowing in the plural stator windings) (in particular considered for each set of remaining sets of windings) at the corresponding frequency. For example, in general, the 6f (six times the electrical frequency of the generator or electrical machine) generator harmonic voltage may be changed by adjusting the 6f Iq and 6f Id harmonic currents. Adjusting the harmonic Iq current may change the generator torque ripple which may cause noise and vibration issue of the generator. In contrast, adjusting the harmonic Id current may have a relatively small impact on the generator torque ripple. Therefore, according to embodiments of the present invention, preferably the harmonic Id current is regulated, to alter harmonics of the generator voltage. In particular, the summed voltage which is output by the control arrangement may be configured, to regulate exclusively or substantially exclusively the Id current in the plural stator windings, while the Iq current is substantially not affected.

In particular the control arrangement is adapted to control the electrical machine so that its currents may be controlled such as to control voltage corresponding to higher harmonics of an electrical frequency of the generator. Thereby, the efficiency of the generator or electrical machine may be improved.

The fundamental current controller is provided to control the magnitude, phase and frequency of the electrical quantities varying with the (basic) electrical frequency (i.e. 1f) of the generator. The fundamental current controller is designed substantially not to influence higher harmonics of the currents and voltages in or at the plural stator windings.

For damping at least one harmonic flux linkage of the generator (such as harmonic n or harmonic m corresponding to n times and m times, respectively, the electrical frequency of the electrical machine), the harmonic flux controller and the (optional) associated harmonic flux calculation module are provided. For each harmonic flux linkage to be damped, the control arrangement may comprise a particular harmonic flux controller and, optionally, an associated particular harmonic flux calculation module connected in series.

The summed voltage command may be supplied to a converter which is connected to output terminals of a generator. The summed voltage command may be a control signal to the converter, in order to control plural power transistors, such as IGBTs. The converter may comprise a generator side converter portion, a DC-link connected to the generator converter portion and a grid side converter portion connected to the DC-link. Each converter portion may comprise in particular six power transistors when the generator has three output phases. The plural power transistors may be controlled by gate driver signals supplied to gates of the respective power transistors. When controlling the converter based on the summed voltage command, the power transistors may be made conductive and non-conductive such as to result in voltages at the plural stator windings corresponding to the summed voltage command. As an effect, a harmonic Id current is injected to the generator. In the ideal case, embodiments of the present invention may substantially remove or at least reduce the generator harmonic flux, i.e. the generator flux oscillated with a particular multiple of the electrical frequency of the generator. In particular, a number of different harmonics may be reduced or even removed.

The dq+ frame may be a frame which rotates in the same sense and with the frequency as the electrical frequency of the electrical machine, in particular generator. The dq− frame may be a coordinate frame rotating in a reverse sense or reversed to the electrical frequency of the generator but having the same frequency. Embodiments of the present invention may also transform particular quantities in a frame rotating with a multiple of the electrical frequency of the generator, the multiple for example being the harmonic to be damped or reduced.

According to an embodiment of the present invention, the control arrangement further comprises a flux linkage calculation module adapted to calculate flux linkage components based on at least the plural stator currents and inductances of the stator windings, the inductances in particular being calculated using a simulation of the electrical machine; the control arrangement in particular further comprising: a flux linkage selection module adapted to select at least one component from the flux linkage components and to derive the flux linkage signal, wherein the selection selects in particular a d-component or a q-component of the flux linkage, wherein the flux linkage signal is determined as a root mean square of selected component(s).

The flux linkage calculation module may receive a number of input signals, in particular the plural stator currents (of the operating set of stator windings), further in particular the inductances, the permanent magnetic flux and also the voltages of the operating set of stator windings. The flux linkage calculation module may output the components in the d-frame of the flux linkage (of the operating set of stator windings).

The flux linkage selection module may select one or more components of the flux linkage, such as a d-component or a q-component.

According to an embodiment of the present invention, the control arrangement further comprises at least one harmonic voltage calculation module configured to receive the reference harmonic current command and to output the reference harmonic voltage command based on the reference harmonic current command.

The harmonic flux controller and/or the harmonic voltage calculation module may comprise hardware and/or software modules and in particular also software code. The flux linkage signal may for example relate to fluxes (or represent fluxes) or a combined value of fluxes, the fluxes being defined in the dq rotating frame. The flux linkage signal may be derived based on plural measured flux quantities. The reference flux linkage signal may represent a desired or demanded flux or desired winding fluxes generated by the plural stator windings.

The electrical frequency of the electrical machine may be calculated as a product of the number of poles and the rotational speed of a rotation shaft rotating in the generator (which rotation shaft may have attached to it in particular permanent magnets being electromagnetically coupled to the plural stator windings).

The reference harmonic current command may in particular represent a d-component of a reference harmonic current, which when injected into the generator, may cause reduction of the flux linkage oscillation oscillating with the particular harmonic, such as harmonic n, harmonic m or the like. The harmonic voltage calculation module transforms the reference harmonic current command into the reference harmonic voltage command, which is then summed with the first voltage command, the second voltage command and a feedforward signal, in order to obtain the summed voltage command. The feedforward voltage signal may be independent of any measured voltage or current at the electrical machine, in particular generator but may depend on the electrical frequency of the electrical machine and reference values regarding current of the generator or electrical machine.

According to an embodiment of the present invention, the harmonic controller comprises a filter arranged to receive the flux linkage signal and the electrical angle of the electrical machine and configured to output a filtered flux linkage signal in which harmonics other than the harmonic of interest in the flux linkage signal are reduced, and a harmonic flux regulator arranged to output the reference harmonic current command based on the filtered flux linkage signal and the reference flux linkage signal.

The harmonic flux controller may be provided for any harmonic to be damped and may be in particular configured depending on the harmonic to be damped. The filter may filter out other harmonics which are not of interest or which are not desired to be damped. The filter may comprise an analog and/or digital filter.

The harmonic flux regulator may be constructed or configured in a number of different manners. However, the harmonic flux regulator is in general adapted, to derive the reference harmonic voltage command, which when supplied to the converter, causes effectively injection of the reference harmonic current into the generator.

According to an embodiment of the present invention, the harmonic flux regulator comprises a difference element arranged for calculating a difference between the filtered flux linkage signal and the reference flux linkage signal, and a regulator system configured to output the reference harmonic current command based on the difference such that when a corresponding reference harmonic current is injected into the stator winding, damping of the harmonic is caused.

The regulator system may be differently arranged as described below.

According to one embodiment of the present invention, the regulator system comprises a phase shifter configured to output a 90 degree shifted difference, a transformation module configured to transform the difference and the shifted difference into a rotating frame corresponding to the harmonics, a first PI-regulator configured to receive the first transformed (previously shifted) difference and to output a first regulator signal, a second PI-regulator configured to receive the second transformed difference and to output a second regulator signal, another transformation module configured to back-transform the first regulator signal and the second regulator signal into a rotating frame corresponding to the electrical frequency of the electrical machine, in order to obtain the reference harmonic current command.

The transformation module is configured to transform the difference and the shifted difference in a coupled manner, (where the Park transformation is applied with use of the angle rotating at harmonic frequency) into a rotating frame corresponding to the harmonic under consideration. The PI-regulators may generate an output based on the transformed difference, such that the difference ideally becomes zero when the summed voltage command is actually supplied to the converter controlling the electrical machine.

The other transformation module is configured to back-transform the first regulator signal and the second regulator signal in a coupled manner, (where the reverse Park transformation is applied with use of the angle rotating at harmonic frequency) into a rotating frame corresponding to the electrical frequency of the electrical machine, in order to obtain the reference harmonic current command (in particular a d-component of the current) For each harmonic frequency, it can take positive or negative values, hence a transformation in the positive reference frame or negative reference frame is required, whilst for each reference frame the rotating signal shall be represented by a d- and a q-components.

According to an embodiment of the present invention, the regulator system comprises a first trigonometric multiplicator configured to output a first multiplied difference, being the difference multiplied by a first trigonometric multiplier depending on the harmonics; a first regulator configured to output a first regulator signal based on the first multiplied difference; a second trigonometric multiplicator configured to output a multiplied first regulator signal, being the first regulator signal multiplied by a second trigonometric multiplier depending on the harmonics; a third trigonometric multiplicator configured to output a third multiplied difference, being the difference multiplied by a third trigonometric multiplier depending on the harmonics; a second regulator configured to output a second regulator signal based on the third multiplied difference; a fourth trigonometric multiplicator configured to output a multiplied second regulator signal, being the second regulator signal multiplied by a fourth trigonometric multiplier depending on the harmonics; and a summation element configured to sum the multiplied first regulator signal and the multiplied second regulator signal and to output the sum as the reference harmonic current command.

The trigonometric multiplier may be a function of a sine or a cosine function having arguments as a multiple of the electrical frequency of the electrical machine, the multiple being the number indicating the harmonics to be damped. By performing multiplications before the respective regulator and after the respective regulator, a transformation in a frame rotating with the multiple of the electrical frequency of the generator and a back-transformation may be achieved. The trigonometric multiplicators may also be implemented in software. Also the regulators may be implemented in software.

According to an embodiment of the present invention, the regulator system comprises a resonant regulator configured to output the reference harmonic current command based on the difference, the resonant regulator being configured to regulate the harmonic.

According to an embodiment of the present invention, the harmonic current calculation module is configured to receive a q-component of the reference harmonic current being determined, in particular using a torque ripple controller, such as to reduce torque ripple in the electrical machine.

Thereby, simultaneously, a torque ripple in the electrical machine may be reduced as well as one or more undesired flux harmonics may be reduced.

According to an embodiment of the present invention, the control arrangement or in particular the fundamental current controller further comprises a negative-sequence current controller configured for providing a second voltage command, in particular in the dq− frame, based on the plural stator currents, wherein the summation system is adapted to add the first voltage command, the second voltage command, the reference harmonic voltage command and in particular a feedforward voltage signal, to obtain the summed voltage command.

According to an embodiment of the present invention, the positive-sequence current controller comprises a frame transformation module for transforming the plural stator currents, into current signals in a dq+ frame based on an electrical angle of the electrical machine, wherein the negative-sequence current controller comprises a frame transformation module for transforming the plural stator currents, into current signals in a dq− frame based on a negative of an electrical angle of the electrical machine.

The plural stator currents may be represented e.g. by three-phase currents which comprise both a positive sequence component and a negative-sequence component. Both components are converted to a rotating frame (dq+) which rotates with electrical speed of the generator. The three-phase currents (both positive-sequence component and negative-sequence component) are converted to Id+ and Iq+ in the dq+ rotating frame. Thereby, the positive sequence component becomes a dc component in dq+ frame, while the negative sequence becomes a $2^{nd}$ order harmonic in dq+ frame.

The dq+ current signal may comprise at least two components, i.e. a positive sequence component and a negative sequence component, in the dq+ frame. The positive sequence component may be a pure DC signal in this frame and may indicate a magnitude of the plural stator currents, if the three phase current are balanced and without distortion (i.e. the plural stator currents, have the same peak value and have a relative phase difference of 120°). If three phase currents are unbalanced, then the negative current component may become $2^{nd}$ order harmonic in dq+ frame. The amplitude of the $2^{nd}$ order harmonic may be indicative for current unbalance. Thereby, the deviations may be detected and then modified.

According to an embodiment of the present invention, the positive-sequence current controller comprises a filter, in particular adaptive filter having as an input the electrical frequency of the generator, for generating a filtered dq+ current signal, in which AC-components, in particular AC-components corresponding to harmonics a multiple of electrical frequency, are reduced in amplitude, and/or wherein the negative-sequence current controller comprises another filter, in particular adaptive filter having as an input the electrical frequency of the generator, for generating a filtered dq− current signal, in which AC-components, in particular AC-components corresponding to multiple of electrical frequency, are reduced in amplitude, wherein, in particular, a filter characteristics of the filter of the negative-sequence current controller and/or the other filter of the positive-sequence current controller is adaptable according to the electrical frequency of the generator.

The filter may be an electronic filter or software implemented filter. The filter may have a transmission characteristics which may be adapted according to the frequency of the plural stator currents. The filter of the positive-sequence current controller may for example filter out or damp AC-components having a frequency of two times, three times, four times, five times, six times or more times the electrical frequency of the generator. Thereby, subsequent process of the dq+ current signal may be simplified and regulation may be enabled.

According to an embodiment of the present invention the negative-sequence current controller comprises a filter, in particular adaptive filter having as an input the electrical frequency of the generator, for generating a filtered dq− current signal, in which AC-components, in particular AC-components corresponding to harmonics of multiple generator electrical frequency, are reduced in amplitude.

According to an embodiment of the present invention, the positive-sequence current controller comprises a regulator, in particular PI-controller, for generating a dq+ voltage signal based on the filtered dq+ current signal and a positive-sequence current reference signal received as further input, and/or wherein the negative-sequence current controller comprises a regulator, in particular PI-controller, for generating a dq− voltage signal based on the filtered dq− current signal and a negative-sequence current reference signal received as further input.

According to an embodiment of the present invention, the fundamental current controller further comprises a voltage feedforward module for generating the feedforward voltage signal based on the positive-sequence current reference signal and the negative-sequence current reference signal and based on electrical frequency of the electrical machine.

The voltage feedforward module may improve the dynamic performance of the controller and decouple components in the d-axis and the q-axis.

According to an embodiment of the present invention, the negative-sequence current controller comprises a reverse frame transformation module for generating the second voltage command as a reverse transformed, in particular according to the negative-sequence of two times the electrical angle, signal output by the regulator of the negative-sequence current controller.

The flux linkage calculation module and/or the selection module of the flux linkage may for example derive as the flux linkage signal the d-axis of the flux linkage or a combination of the d-component and the q-component of the flux linkage, such as a particular percentage of the d-axis flux linkage and another percentage of the q-axis flux linkage. Thereby, ripples may be effectively reduced.

It may be possible to use the control arrangement for applications like motor drives and electrical cars.

According to an embodiment of the present invention it is provided a generator system comprising: a generator having a rotor and at least one set of plural stator windings; at least one converter, wherein the plural stator windings of each of the at least one set of stator windings are connected to a corresponding converter of the at least one converter; a control arrangement according to one of the preceding embodiments for each converter, connected to the corresponding converter, wherein the generator is in particular a variable frequency generator, wherein the converter is in particular a AC-DC-AC converter.

The generator system may in particular be comprised in a wind turbine. In particular, the generator may have at least two plural stator windings or two or more sets of stator windings, each set in particular belonging to a particular stator segment or the two or more sets belonging to a single stator forming the full circumference. Further, the generator system may comprise at least two converters, wherein the plural stator windings of each set of stator windings are connectable to a corresponding converter of the at least two converters. Further, the generator system may comprise at least two control arrangements according to an embodiment as described above, wherein each control arrangement is connectable to a corresponding converter of the at least two converters. Thereby in particular, if one set of stator windings or its converter fails, it may be ensured that the remaining stator windings of the remaining set or sets have appropriate stator currents. Thereby, the operation of the generator system may be improved, in particular regarding efficiency and noise reduction.

Further, a wind turbine is provided, comprising a rotor shaft having plural rotor blades connected thereon and a generator system according to the preceding embodiment, where the rotor of the generator system is mechanically coupled with the rotor shaft.

Embodiments of the present invention are now described with reference to the accompanying drawings. The invention is not restricted or limited to the illustrated or described embodiments.

BRIEF DESCRIPTION

FIG. 1 schematically illustrates a wind turbine according to an embodiment of the present invention including an arrangement according to an embodiment of the present invention;

Figure 3:
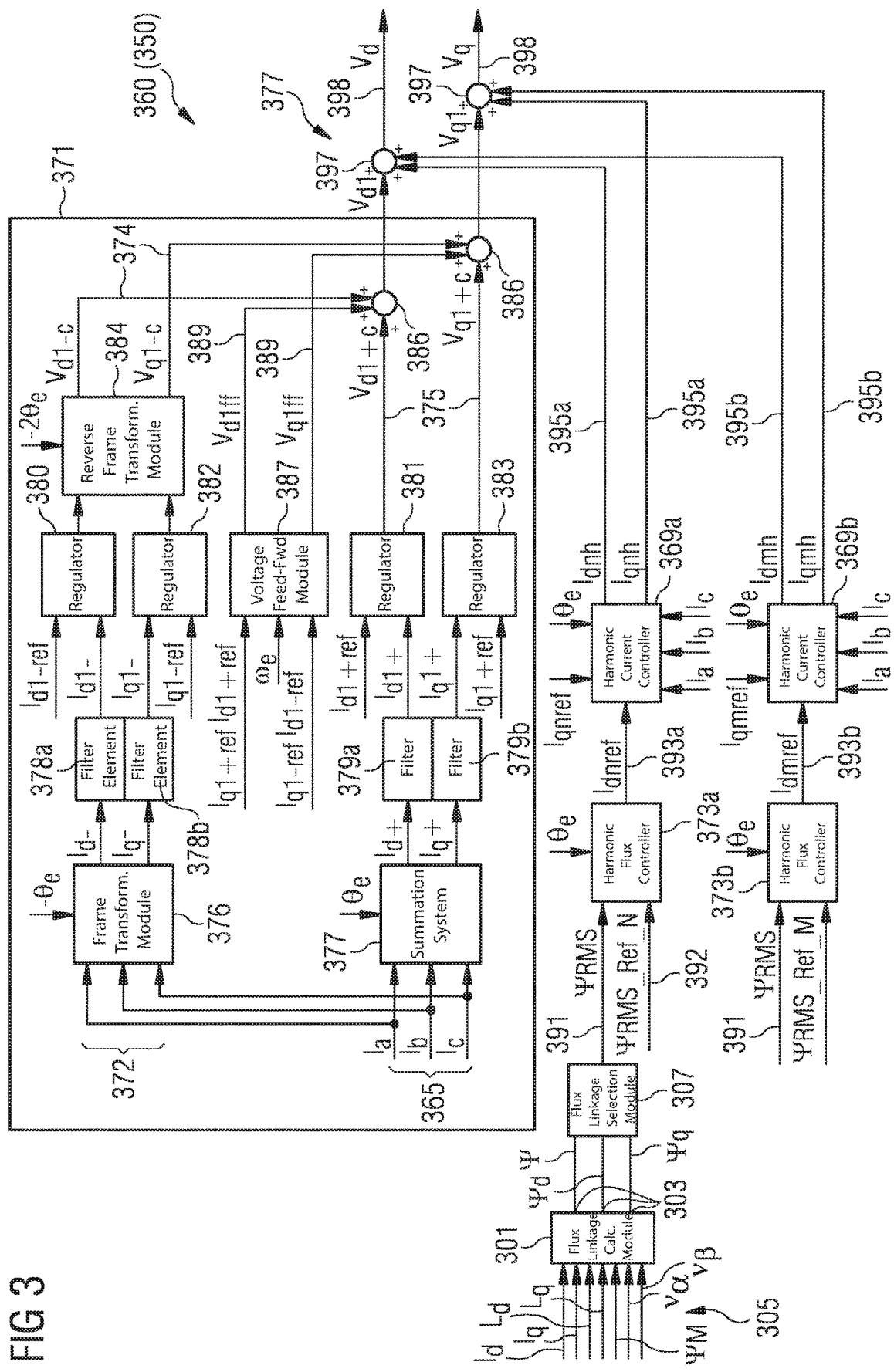
FIG. 3 illustrates a schematic diagram of a control arrangement according to an embodiment of the present invention which may for example be comprised in the generator system according to an embodiment of the present invention.
Figure 4:
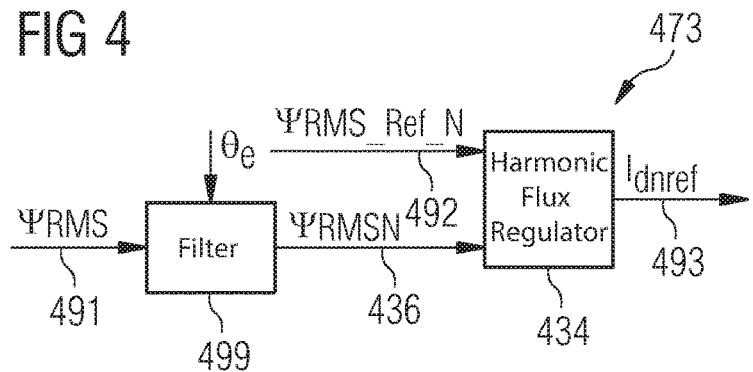
Figure 5:
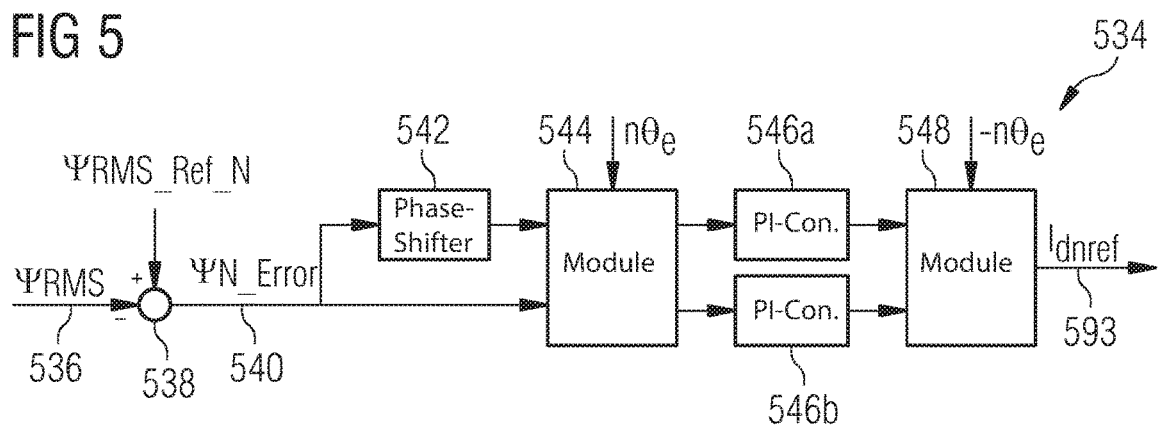
Figure 6:
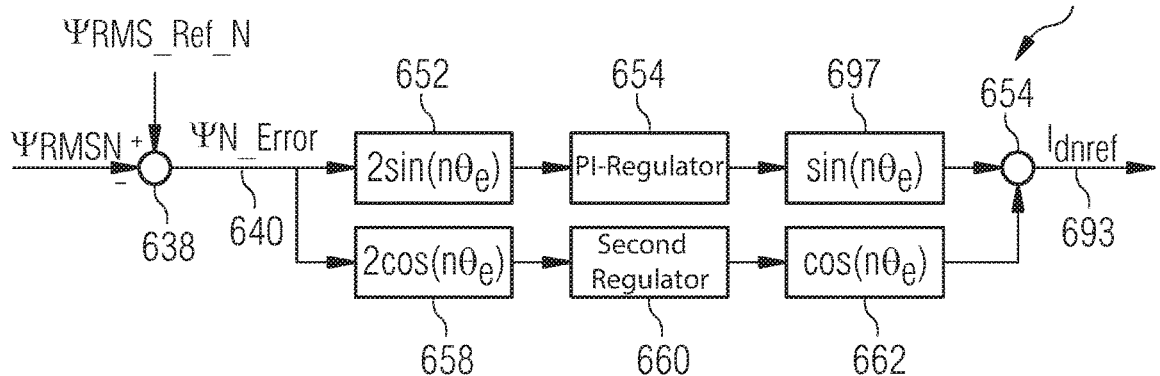
Figure 7:
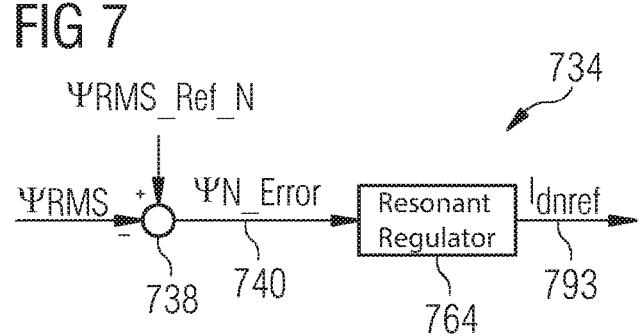
Figure 8:
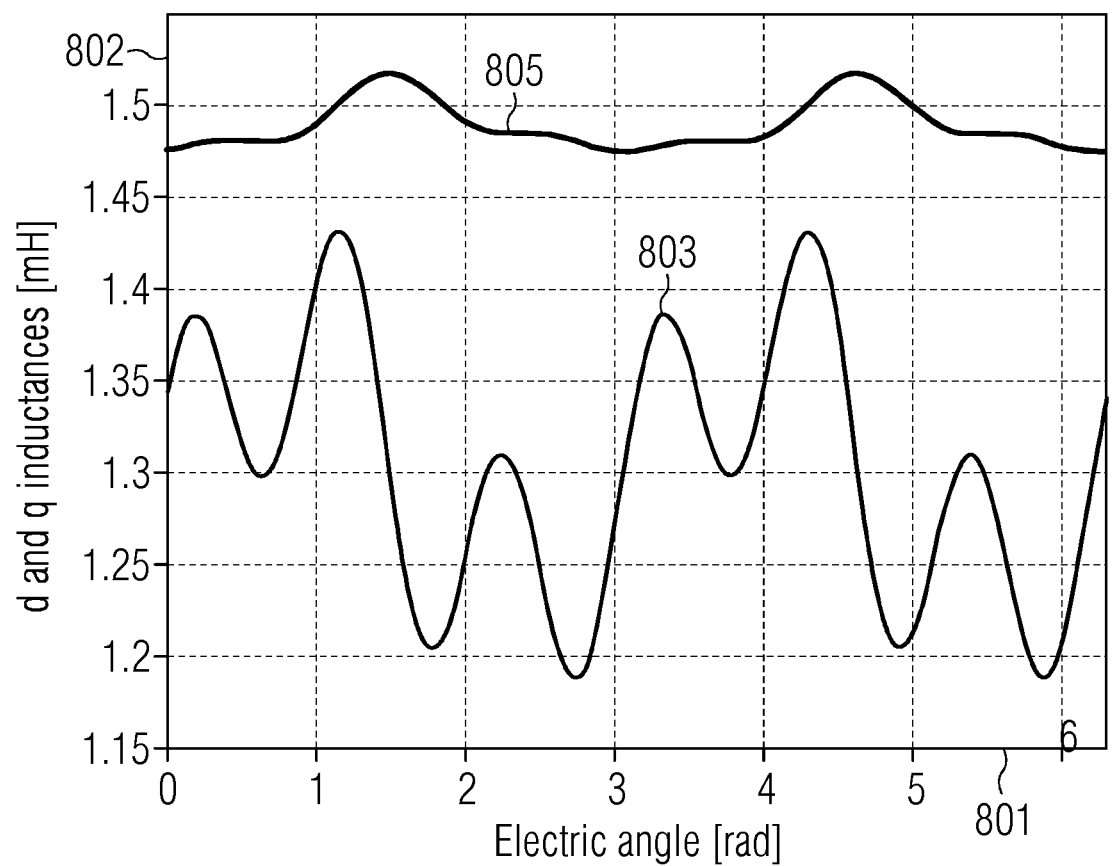
Figure 9:
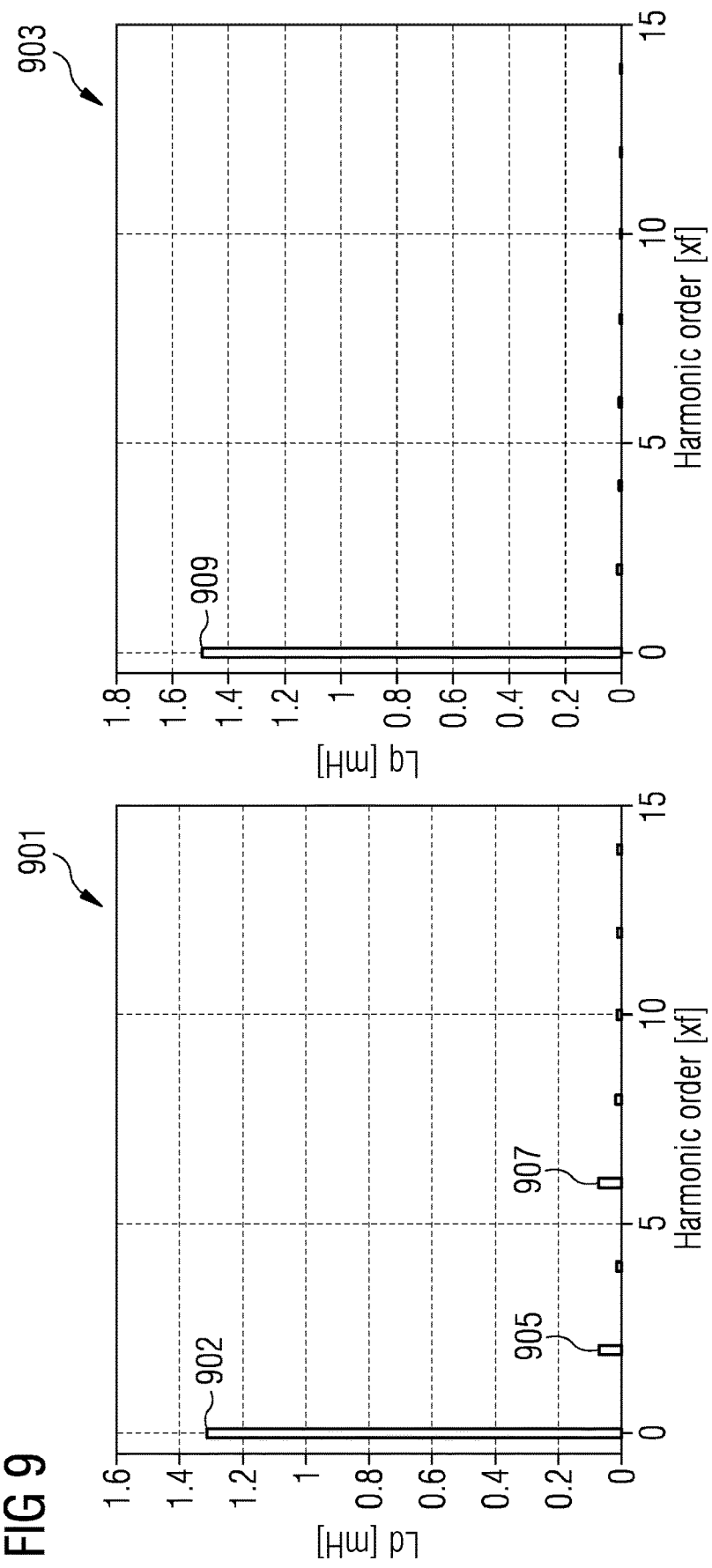
Figure 10:
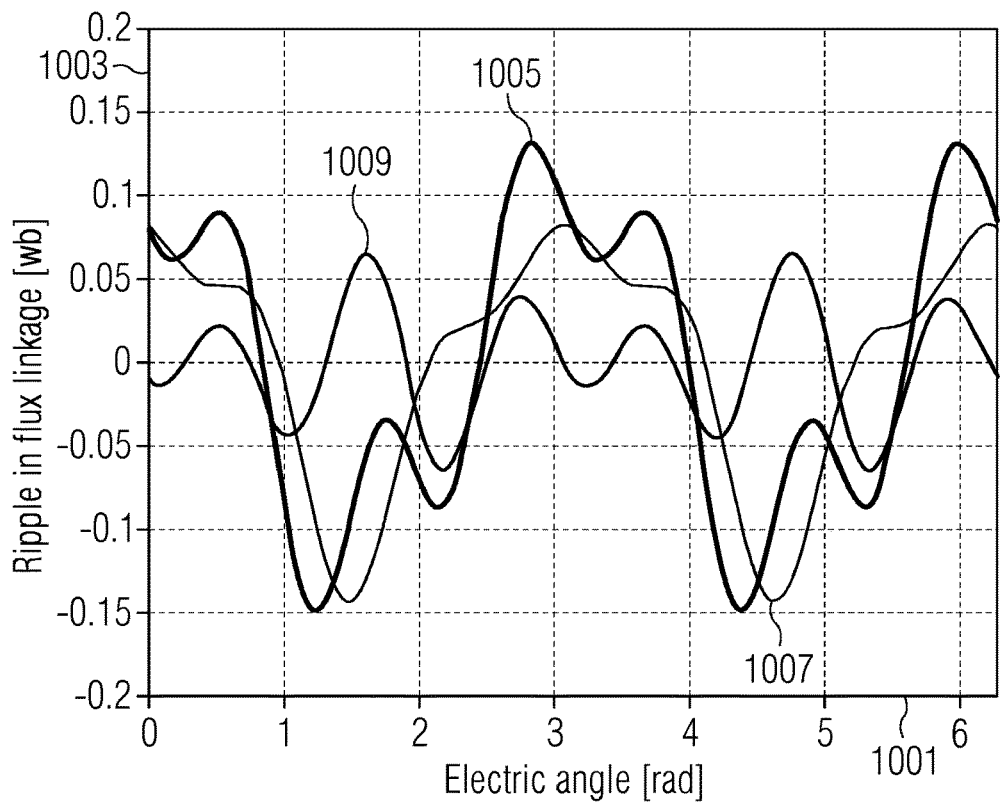
Figure 11:
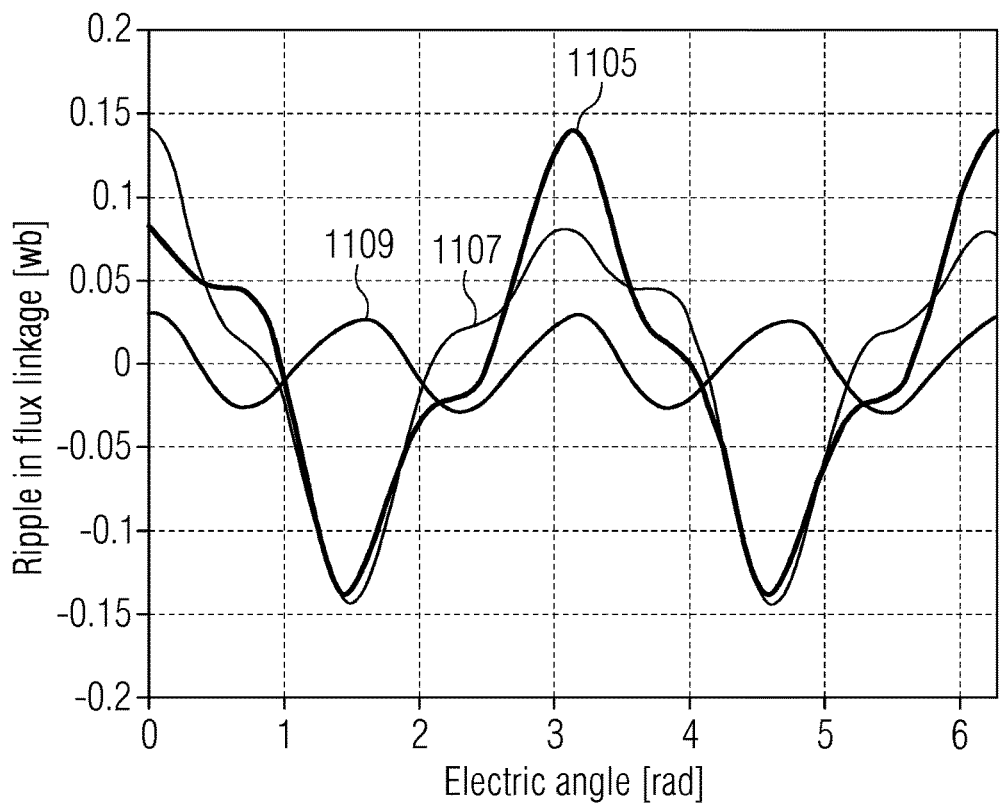
Figure 12:
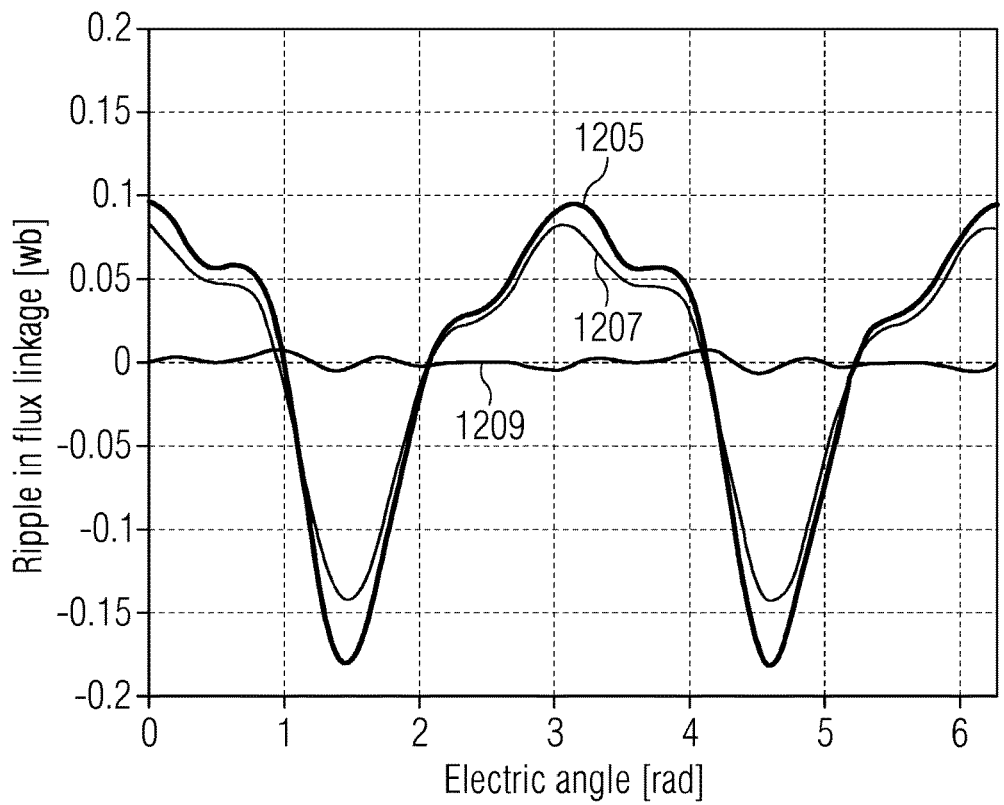
Figure 13:
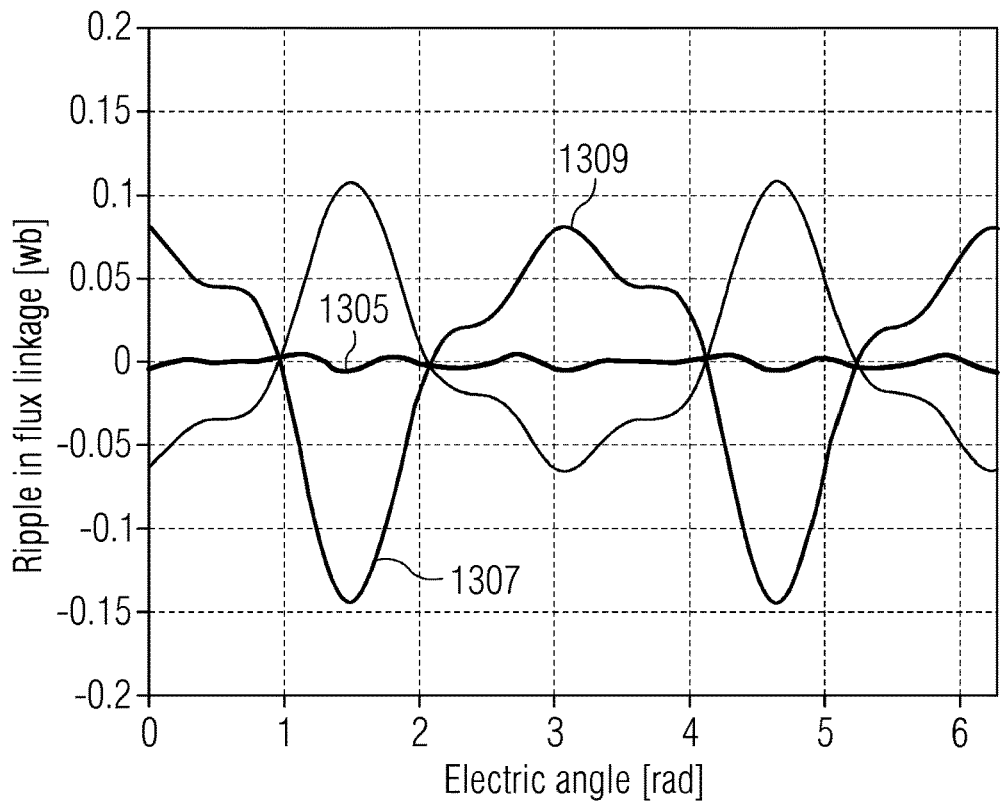
Figure 14:
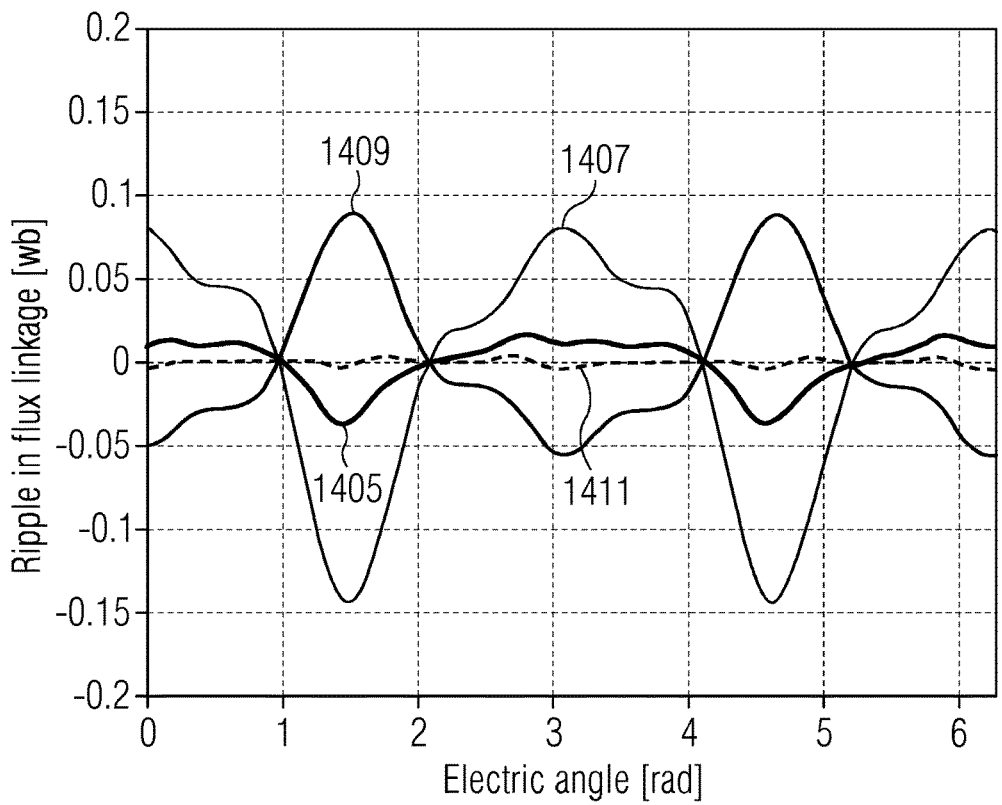
Figure 15:
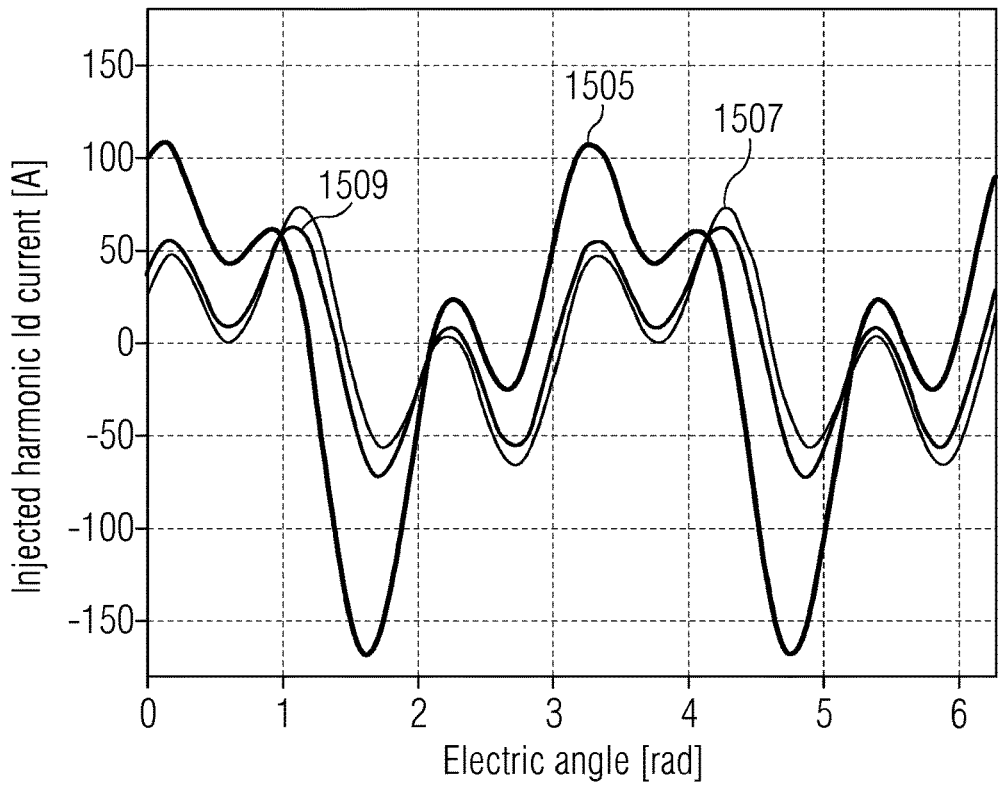

FIG. 4 schematically illustrates a harmonic flux controller which may be comprised in the control arrangement illustrated in FIG. 3;

FIG. 5 schematically illustrates an example of a harmonic flux regulator which may be comprised in the harmonic flux controller illustrated in FIG. 4;

FIG. 6 schematically illustrates another example of a harmonic flux regulator which may be comprised in the harmonic flux controller illustrated in FIG. 4;

FIG. 7 schematically illustrates a further example of a harmonic flux regulator which may be comprised in the harmonic flux controller illustrated in FIG. 4;

FIG. 8 illustrates inductances as calculated and used in embodiments of the present invention;

FIG. 9 illustrates harmonics of inductances as calculated and used in embodiments of the present invention;

FIG. 10 illustrates a first flux linkage graph as achieved in embodiments according to the present invention;

FIG. 11 illustrates a second flux linkage graph as achieved in embodiments according to the present invention;

FIG. 12 illustrates a third flux linkage graph as achieved in embodiments according to the present invention;

FIG. 13 illustrates a fourth flux linkage graph as achieved in embodiments according to the present invention;

FIG. 14 illustrates a fifth flux linkage graph as achieved in embodiments according to the present invention; and FIG. 15 illustrates a sixth flux linkage graph as achieved in embodiments according to the present invention.

DETAILED DESCRIPTION

Figure 1:
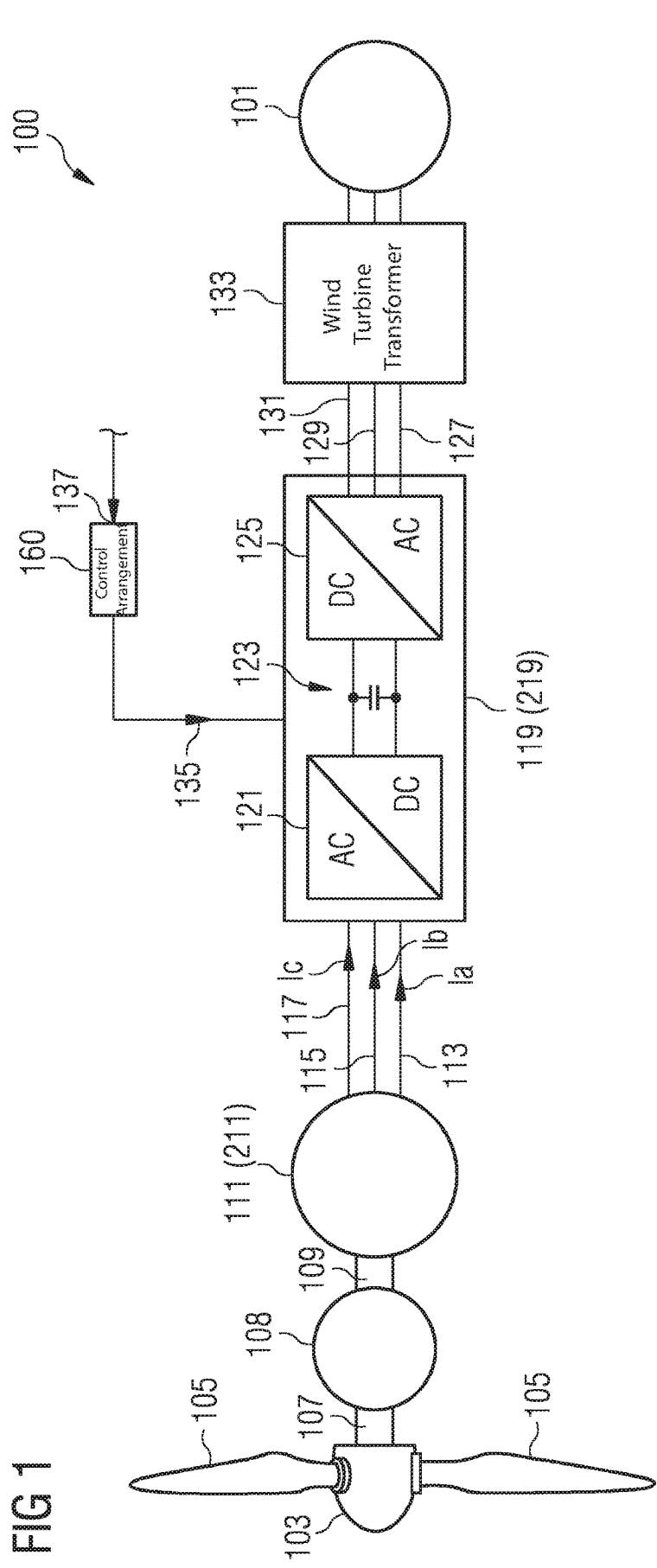

FIG. 1 illustrates in a schematic form a wind turbine 100 which provides electric energy to a utility grid 101.

The wind turbine comprises a hub 103 to which plural rotor blades 105 are connected. The hub is mechanically connected to a main shaft 107 whose rotation is transformed by a gear box 108 to a rotation of a secondary shaft 109, wherein the gear box 108 may be optional. The main shaft 107 or the secondary shaft 109 drives a generator 111 (or 211 for the second channel) which may be in particular a synchronous permanent magnet generator providing a power stream in the three phases or windings 113, 115 and 117 to a converter 119 which comprises a AC-DC portion 121, a DC-link 123 and a DC-AC portion 125 for transforming a variable AC power stream to a fixed frequency AC power stream which is provided in three phases or windings 127, 129, 131 to a wind turbine transformer 133 which transforms the output voltage to a higher voltage for transmission to the utility grid 101.

The converter 119 (or 219 for the second channel) is controlled via a converter command 135 which is derived and supplied from a control arrangement 160 according to an embodiment of the present invention, which receives at least one input signal 137, such as stator winding currents and one or more reference values or one or more quantities indicative of the operation of the generator 111 or any component of the wind turbine 100.

The generator in FIG. 1 comprises a single three-phase stator winding or multiple three-phase stator windings. Thereby, the winding 113 carries the stator current $I_a$, the winding 115 carries the stator current $I_b$ and the winding 117 carries the stator current $I_c$. The control arrangement 160 controls the converter 119.

Figure 2:
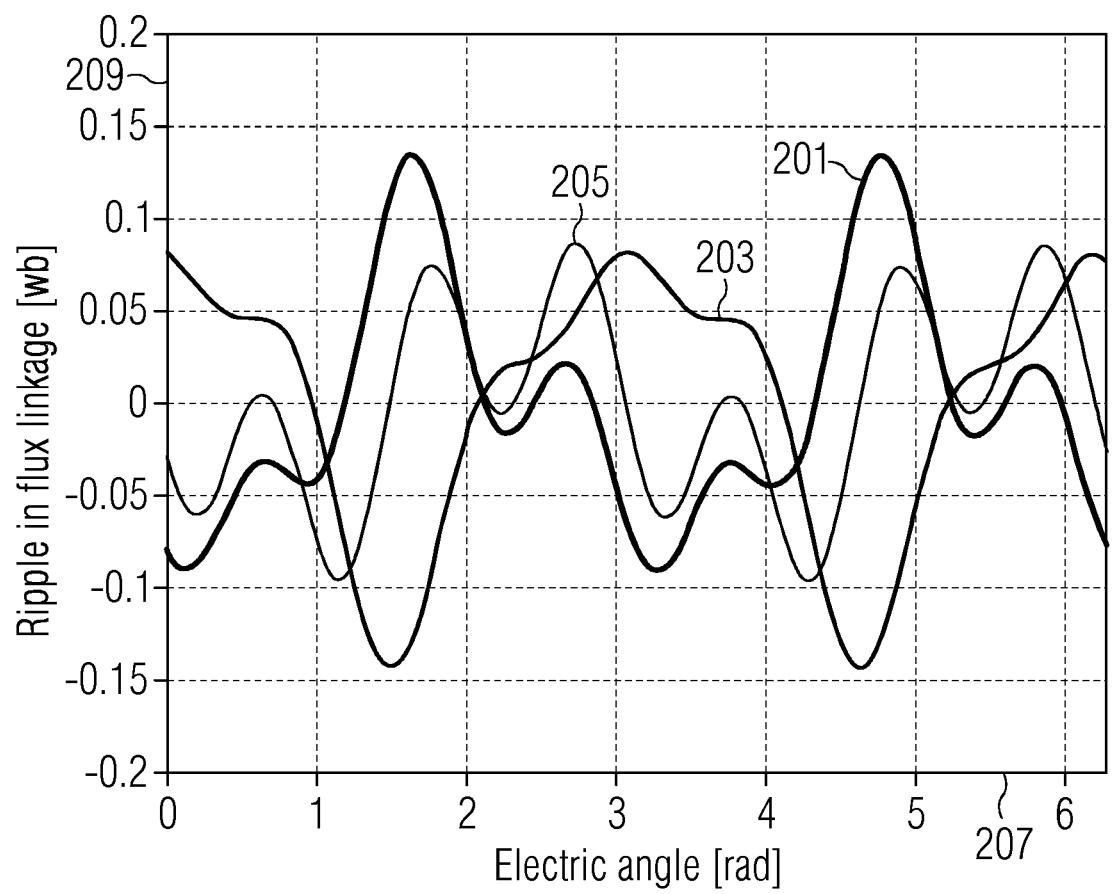
FIG. 2 illustrates flux linkages as observed according to the prior art.

FIG. 2 illustrates curves of a total flux linkage 201, of a d-component 203 of the flux linkage, and of a q-component 205 of the flux linkage, wherein an abscissa 207 indicates the electric angle and an ordinate 209 indicates the ripple in flux linkage. Herein, the electrical machine is controlled with constant $I_d$ and $I_q$ currents. Clearly, there are a lot of harmonics in the d, q and total flux linkages as indicated in FIG. 2.

Embodiments of the present invention reduce the ripples in the flux linkage. Since the magnet is conductive, an eddy current can be induced if there is a flux variation and then an eddy current loss will be generated in the magnet. The eddy current losses may be expressed by equation (2), $$p_{pm\_h} = \Sigma_n \left\{ \int_{magnet} \frac{|J_n|^2}{2\sigma} dv \right\} \quad (2)$$

wherein $J_n$ is the size of the eddy current induced by the nth harmonic in the flux.

Clearly, if the ripple level in the flux linkage may be lowered according to the embodiments of the present invention, the induced eddy current in the magnet may be reduced. Thus, minimization in the flux linkage ripple as achieved by embodiments of the present invention may lead to the minimum harmonic losses in the magnet.

FIG. 3 schematically illustrates an example of a control arrangement 360 (or 350 for the second channel) according to an embodiment of the present invention. The control arrangement 360 comprises a fundamental current controller 371, at least one harmonic flux controller 373, in particular an Nth harmonic flux controller 373a and an Mth harmonic flux controller 373b. The control arrangement 360 further comprises at least one harmonic current calculation module, in particular a Nth harmonic current controller 369a and a Mth harmonic current controller 369b. The control arrangement 360 further comprises a summation system 377 for adding outputs of the fundamental current controller 371 and the harmonic current controller 369a and 369b.

The fundamental current controller 371 thereby includes a negative-sequence current controller 372 which is configured for providing a second voltage command Vd1-c, Vq1-c (also referred to as 374), based on the plural stator current $I_a$, $I_b$, $I_c$. Thereby, the stator currents $I_a$, $I_b$, $I_c$ (e.g. for each operating set of stator windings) are provided to a frame transformation module 376 which further receives the negative of the electrical position $\Theta_e$ of the generator and outputs the current in the negative-sequence frame, namely Id−, Iq− and provides it to a (double) filter 378a, b. The output of the filter 378, which is in particular implemented as two separate filter elements 378a, 378b, comprises the (1f harmonic of) negative sequence d-component of the current, i.e. Id1−, and the negative-sequence q-component of the current, namely Iq1− ('1' stands for the 1f harmonic, i.e. the fundamental generator electrical frequency). The current components are provided separately to two regulators, namely an Id1-regulator 380 and a Iq1-regulator 382 which further receive reference values of the corresponding current components. The regulators 380, 382 output signals to a reverse frame transformation module 384 which further receives the negative of two times the electrical position (i.e. −2$\Theta_e$) of the generator. The reverse frame transformation module 384 outputs the second voltage command 374 here represented and denoted as Vd1-c, Vq1-c which are supplied to summation elements 386.

The fundamental current controller 371 further comprises the positive-sequence current controller 365 which is implemented similar to the negative-sequence current controller 372 but which comprises the frame transformation module 377 which transforms the three stator currents $I_a$, $I_b$, $I_c$ into the positive-sequence current components Id+, Iq+ which are provided to the filter 379a, b which diminishes or damps higher harmonics and outputs the positive-sequence current components Id1+, Iq1+ which are separately supplied to the regulators 381, 383 which further receive reference values of the corresponding current components. The regulators output a first voltage command 375, i.e. Vd1+c, Vq1+c which are also provided to the summation elements 386.

The fundamental current controller 371 further comprises a voltage feedforward module 387 which receives reference values of the currents in the positive-sequence frame and also the negative-sequence frame, namely Iq1+ ref, Id1+ ref, Iq1− ref, Id1− ref. Further, the feedforward module 387 receives the electrical frequency of the generator $\omega_e$. The voltage feedforward module 387 outputs the voltage feedforward command 389, namely Vd1ff, Vq1ff, which is also provided to the summation elements 386.

The control arrangement 360 may comprise at least one harmonic flux controller 373 which is connected to a corresponding harmonic current controller (also referred to a harmonic voltage calculation module) 369, wherein each of the harmonic flux controllers may be provided for damping a particular harmonic of the electrical frequency of the generator.

As an example, the control arrangement 360 illustrated in FIG. 3 comprises two harmonic flux controllers 373a and 373b which are related to a corresponding harmonics N, M of an electrical frequency of the electrical machine, in particular the generator 111 or 211 illustrated in FIGS. 1 and 2, respectively. Thereby, each harmonic flux controller receives as input a (e.g. measured) flux linkage signal 391 in this case $\Psi_{RMS}$, and further a reference value 392 of the flux linkage. The harmonic flux controller 373 further receives the electrical angle or electrical position $\Theta_e$ of the generator and outputs based on these inputs, a reference harmonic current command 393, i.e. in the particular example Idnref which is provided to the harmonic current controller 369.

The harmonic current controller 369a, 369b receive as inputs a d-component of the reference harmonic current, i.e. Idnref corresponding to this harmonic n (n being equal to N). The harmonic current controller further receives the electrical position $\Theta_e$ of the generator and the three stator currents $I_a$, $I_b$, $I_c$. The harmonic current controller 369 outputs the corresponding reference harmonic voltage command 395, i.e. 395a and 395b, respectively for the different harmonic current controller 369a, 369b. The reference harmonic voltage command is denoted as Vdnh, Vqnh for the nth harmonic.

The reference harmonic voltage commands 395a, 395b are provided, in particular separately for each component in the dq-frame, to summation elements 397 to which also the output of the fundamental current controller 371 is provided. The summed first voltage command 395, the second voltage command 374 and the feedforward voltage command 389 added to the harmonic voltage commands 395a, 395b are denoted as summed voltage commands 398, i.e. Vd, Vq. This summed voltage command 398 may then be provided as a control signal to a converter, such as converter 119 illustrated in FIG. 1.

The control arrangement 360 illustrated in FIG. 3 comprises the fundamental current controller 371 for using fundamental positive-sequence and/or negative-sequence current references, current feedback signals and generator electrical frequency in combination with fundamental positive- and negative-sequence regulators (Id1+ regulator, Iq1+ regulator, Id1− regulator, Iq1− regulator) and voltage feedforward providing fundamental voltage commands (Vd1, Vq1). Thereby, the "1" relates to the first harmonic, i.e. the electrical frequency of the generator.

The arrangement 360 further comprises a flux linkage calculation module 301 which is adapted to calculate flux linkage components 303, such as $\psi_d$, $\psi_q$ based at least on the plural stator currents $I_d$, $I_q$ and further the inductances $L_q$, $L_d$, the permanent magnet flux $\psi_{pm}$ and the voltages $V_\alpha$, $V_\beta$ which are received as input values 305. The flux linkage components 303 are supplied to a flux linkage selection module 307 which is adapted to select at least one component from the flux linkage components 303 and to derive the flux linkage signal 391 ($\psi_{RMS}$).

$\psi_{RMS}$ is the root-mean-square value of the selected flux linkage signal, and can be calculated in a recursive manner, e.g. in a software implementation. The window (L) for the calculation can cover one full or multiple cycles of the harmonic signal, or simply take a fixed length. For example, $$\psi_{RMS} = \sqrt{\frac{1}{L}\sum_i^L \psi_i^2}$$

The flux linkage signal 391 is thereby calculated online by the use of $I_d$ and $I_q$ currents and the offline calculated d and q axis inductances and the permanent magnet flux linkage, representing the input signals to the flux linkage calculation module 301. Then, the selected harmonic component is extracted from the calculated flux linkage and used in a harmonic control system represented by the modules 373, 369.

The flux linkage calculation is not necessarily in the dq-frame, but may alternatively be performed in the α-β frame. Thereby, the flux linkage may be obtained by integrating the supply voltages directly according to equation 3 below:

$$\begin{cases} v_\alpha = R_s i_\alpha + \dfrac{d\psi_{s\alpha}}{dt} \\ v_\beta = R_s i_\beta + \dfrac{d\psi_{s\beta}}{dt} \end{cases} \quad (3)$$

This equation may be based on the observation that the minimization of flux linkage in the α-β frame may lead to the minimization of flux linkage in the dq-frame. This alternative may have the advantage to be less dependent on the machine parameters.

The control arrangement 360 further comprises at least one unit 369 for calculating harmonic voltage commands (Vdnh, Vqnh) based on harmonic current commands. This unit can be a closed-loop regulation of harmonic current or open-loop calculation of harmonic voltage.

A similar or same configuration may be used for regulating mth harmonic voltage. If more harmonics need to be controlled, more modules, i.e. further harmonic flux controllers 373 and corresponding further harmonic current controllers 369, may be provided. The outputs from different harmonic current controllers shall be added together.

Therefore, the control arrangement 360 comprises summation elements 386, 397 for adding voltage commands to achieve the summed command, i.e. the converter control signals 398.

The positive-sequence fundamental current controller in the synchronous d-q frame $+\omega_e$ may be well-known. To regulate negative-sequence fundamental current, the three-phase current may be converted to a rotating frame with $-\omega_e$ speed by a park transformation. The fundamental negative-sequence current may then be converted from AC to DC after the transformation. A PI controller may be used to regulate the negative currents following their references in this rotating frame. For achieving a better dynamic performance and decoupling, a voltage feedforward may also be used in this rotating frame. The outputs of the voltage feedforward and positive- and negative-sequence current regulators are added together giving fundamental voltage commands at the output of the fundamental current controller 371.

The control scheme shown in FIG. 3 comprises:
1) a fundamental current controller configured for using fundamental positive-sequence and/or negative-sequence current references, current feedback signals and generator electrical frequency in combination with fundamental positive and negative sequence regulators (Id1+ regulator, Iq1+ regulator, Id1− regulator, Iq1− regulator) and voltage feedforward providing fundamental voltage commands ($V_{d1}$, $V_{q1}$)
2) a function for calculation of flux linkages using measured currents and offline calculated machine parameters such as inductances and PM flux linkage.
3) a function for calculation of flux linkages using the measured or commanded control voltages.
4) a function for selection of flux linkage that is to be minimised.
5) at least one generator harmonic flux linkage controller using the harmonic flux command $\psi_{RMS\_Ref\_N}$ (The command as 0 in most of cases), calculated flux linkage feedback signal $\psi_{RMS}$ and electrical angle of generator in combination with regulators for controlling harmonic flux linkage to follow command in order to obtain harmonic current command ($I_{dnref}$).
6) at least one unit for calculating harmonic voltage command ($V_{dnh}$, $V_{qnh}$) based on harmonic current command (This unit can be closed-loop regulation of harmonic current or open-loop calculation of harmonic voltage)
7) and summation elements configured for adding voltage commands to achieve the converter control signals.

The same configuration can be used for regulating mth harmonic flux linkage as shown in FIG. 6. If more harmonics need to be controlled, more modules can be added. The outputs from different harmonic current controllers shall be added together.

FIG. 4 illustrates an embodiment of a harmonic flux controller 473 which comprises a filter 499 which is arranged to receive the flux linkage signal 491 and the electrical angle $\Theta_e$ of the generator and which is configured to output a filtered flux signal 492 denoted as $\Psi_{RMSN}$ (in which harmonics other than N are reduced) which is provided to a harmonic flux regulator 434. Thereby, the harmonic flux regulator also receives the reference flux linkage signal 492 (which may e.g. indicate that the Nth harmonic voltage should be zero). The harmonic flux regulator 434 outputs the reference harmonic current commands 393 also denoted as Idnref.

In FIG. 4, details are shown of harmonic flux controllers according to embodiments of the present invention. The harmonic flux is controlled by the harmonic current in Id (Idnref), while the harmonic current command in Iq (Iqnref) may be provided by other control features, such as a torque ripple controller that minimizes generator torque ripple. The estimated/measured generator flux in the dq frame passes an adaptive filter so that the Nth harmonics in the flux is higher than harmonics at other frequencies. The Nth harmonic flux and their commands or reference values (normally zero) are input to the harmonic flux regulator 434. The harmonic flux regulator 434 will regulate the harmonic flux to follow their commands by outputting proper harmonic current commands Idnref.

FIGS. 5, 6 and 7 illustrate example embodiments of a harmonic flux regulator. Options of the harmonic flux regulator 434 are illustrated in FIGS. 5, 6 and 7. Thereby, in all options, the error 540, 640, 740 is calculated and a closed-loop regulation of the harmonic flux is made so that the nth harmonic flux will follow the nth harmonic flux command or reference. Thus, the regulators may be used to control harmonic flux error to zero.

The harmonic flux regulator 534 illustrated in FIG. 5 comprises a summation element 538 to which the filtered flux linkage signal 536 and the reference flux linkage signal 592 is provided. The error signal 540 or the difference 540 is provided to a 90° phase-shifter 542 which shifts the signal by 90° and is supplied to a frame transformation module 544 which receives n times the electrical position $\Theta_e$ of the generator, wherein n corresponds to the harmonic to be damped. The frame transformation module 544 further receives the difference 540. The frame transformation module outputs the transformed difference to a first PI-regulator 546a and outputs the transformed difference to a second PI-regulator 546b which provide their outputs to another transformation module 548 which receives as input the negative of n times the electrical position of the generator and finally outputs the reference harmonic current command 593.

In FIG. 5, the phase of the regulation error is filtered 90° by a phase-shifter 542. This could be achieved by a filter or a derivative. The two components are converted to the nth rotating frame by a park transformation in module 544. A simple PI-controller 546a, 546b could be used as the regulators in the nth rotating frame. The outputs of the PI-regulators 546 are converted back to the nth rotating frame as the outputs of the harmonic flux regulator.

FIG. 6 illustrates a harmonic flux regulator 634, wherein the error 640 or difference is provided to a first trigonometric multiplicator 652 which multiplies the error by 2 sin(n$\Theta_e$) and provides the output to a PI-regulator 654 whose output is passed through a second trigonometric multiplicator 656 multiplying by sin(n$\Theta_e$). Furthermore, the difference 640 is passed through a third trigonometric multiplicator 658 which multiplies the error by 2 cos(n$\Theta_e$) and provides the output to a second regulator 660 which supplies its output to a fourth trigonometric multiplicator 662 which multiplies the input by cos(n$\Theta_e$). The outputs of the second and fourth trigonometric multiplicators 656, 662 are provided to a summation element 697, the sum represents the reference harmonic current command 693.

FIG. 7 illustrates a harmonic flux regulator 734 wherein the difference 740 is provided to a resonant regulator 764 which is configured to output the reference harmonic current command 793 based on the difference 740, wherein the resonant regulator 764 is configured to regulate the harmonic (in this case the harmonic N). A typical transfer function of the resonant regulator may be as follows:

$$RR(s) = k_p + k_i \frac{4\pi f_1 \xi_1 S}{s^2 + 4\pi f_1 \xi_1 s + (2\pi f_1)^2}$$

Therein, $f_1$ is the resonance frequency and $\xi_1$ is the damping of the controller.

In particular, the examples illustrated in FIGS. 6 and 7 are based on vector control principle. The regulation error 640, 740 passes sine channel and cosine channel and the output signals of the sine and cosine channels are summed using a summation element. Simple PI-controllers could be used as regulator.

FIGS. 8 and 9 illustrate inductances $L_q$, $L_d$ as calculated and used in embodiments of the present invention when the machine is in reduced-channel operation. Curve 803 in FIG. 8 represents the d-component of the inductance, i.e. $L_d$, while the curve 805 represents the q-component of the inductance, i.e. $L_q$ of a set of stator windings which is operating. Herein, the inductances are depicted in dependency of the electric angle as indicated on the abscissa 801, while the magnitude of the inductances is indicated in the ordinate 802. As can be appreciated from FIG. 8, the inductances vary over the machine electrical cycle. This dependency on the electrical angle may be considered and taken into account in embodiments of the present invention.

FIG. 9 illustrate a graph 901 showing harmonic of the d-component of the inductance, while the graph 903 shows harmonics of the q-component of the inductance of a set of stator windings. As can be appreciated from the graph 901 in FIG. 9, the d-component of the inductance, i.e. $L_d$, has several harmonic frequency components including the base frequency component 902, the harmonics of the second order 905 and a harmonics in the sixth order 907. The q-component has mainly the base frequency component 909. The inductances may be calculated using a simulation or an observer model. The results of the inductances may be used for calculation of the flux linkages according to the above equation (1). Thereby, the calculation may take into account a coupling between different sets of stator windings of a multiple channel permanent magnetic electrical machine.

FIGS. 10 to 15 illustrate graphs having as abscissa 1001 to 1501 the electric angle of the electrical machine and having as an ordinate 1003 to 1503 the magnitude of the flux linkage curves of flux linkages as achieved in embodiments according to the present invention.

In FIG. 10, the curve 1005 denotes the d-component of the flux linkage, the curve 1007 denotes the q-component of the flux linkage and the curve 1009 denotes the total flux linkage.

In the FIG. 11, the curve 1105 denotes the d-component of the flux linkage, the curve 1107 denotes the q-component of the flux linkage and the curve 1109 denotes the total flux linkage.

In the FIG. 12, the curve 1205 denotes the d-component of the flux linkage, the curve 1207 denotes the q-component of the flux linkage and the curve 1209 denotes the total flux linkage.

In a typical surface mounted PM machine, there is a low level of saliency and the contribution to torque production from Id current is limited. If a relatively small quantity of harmonic is injected in Id, the impact to torque ripple will be marginal. However, this harmonic Id current can make a huge difference to the harmonic content in the flux linkage, and thus harmonic losses in magnet. In the following are a few examples to illustrate how the harmonics in the total flux linkage can be minimised by Id harmonic injection.

1) Id Harmonic Injection for Minimisation of 2f in Flux Linkage

At injection of a 2f component in Id current, its phase angle and amplitude are varied, until the 2f component in the resulted flux linkage reaches the minimum. In this case, the 2f Id current to be injected would have an amplitude of 90 A and a phase angle of 5.85 rad (or 335 deg). The results are given in FIG. 10, which show a great reduction of ripple in the total flux linkage. In this and the following analysis it is assumed that a small amount of Iq2 (10 A) has already existed, and its amplitude has been investigated to have little effect on the Id2 optimal angle.

2) Id Harmonic Injection for Minimisation of 2f and 6f in Flux Linkage

Further harmonic at 6f can be injected in the Id current, and after searching of the optimal 6f Id (amplitude: 50 A; phase: 5.85 rad) the resultant flux linkages are shown in FIG. 11.

3) Id Harmonic Injection for Minimisation of 2f, 4f and 6f in Flux Linkage

From FIG. 11, it can be seen that there is a level of 4f component in the total flux linkage. An optimised 4f (amplitude: 35 A; phase: 3.26 rad) is thus injected in the Id, together with the previous defined 2f and 6f harmonic injections. The ripple in the total flux linkage becomes significantly lower, as presented in FIG. 12.

The FIGS. 13 to 15 illustrate the flux linkages as achieved according to other embodiments of the present invention.

Thereby, in the FIG. 13, the curve 1305 denotes the d-component of the flux linkage, the curve 1307 denotes the q-component of the flux linkage and the curve 1309 denotes the total flux linkage. Further, in FIG. 14, the curve 1405 denotes the d-component of the flux linkage, the curve 1407 denotes the q-component of the flux linkage, the curve 1409 denotes the total flux linkage and the curve 1411 denotes the combined flux linkage. Finally, in FIG. 15, the curve 1505 denotes the optimum for the total flux linkage, the curve 1507 denotes the optimum for the d-flux linkage and the curve 1509 denotes the optimum for the combined flux linkage.

Depending on the relationship between the harmonics in the flux linkage(s) and the magnet harmonic losses, other control objectives may be considered for application. For example:

1) Minimisation of Harmonics in d-Axis Flux Linkage

With the similar minimisation process described earlier, the ripple in the d flux linkage can be significantly reduced by injecting harmonic Id current of 2f, 4f and 6f. A result is shown in FIG. 13. In this case, the ripple in d flux linkage is very low, though the ripple in the total flux linkage is pretty high, so is the ripple in q flux linkage.

2) Minimisation of Harmonics in Combined d- and q-Axis Flux Linkage (Equal Combination Will be the Total Flux Linkage)

The optimisation objective could be a combination of the d- and q-axis flux linkage. In an example presented in FIG. 14, a split of 70% d-axis flux and 30% q-axis flux is assumed. Whilst the ripple in the combined flux linkage can be minimised by injecting 2f, 4f and 6f components in the Id current, the ripples in the d-axis, q-axis and total flux linkage could be relatively high.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A control arrangement for controlling an electrical machine having plural stator windings separately connectable to a converter, the control arrangement comprising:
a fundamental current controller, configured for providing a first voltage command in a dq+ frame, based on plural stator currents of the plural stator windings;
the control arrangement further comprising:
at least one harmonic flux controller related to a harmonic of an electrical frequency of the electrical machine, wherein the harmonic flux controller is configured to receive as inputs:
a flux linkage signal related to flux linkages generated by the plural stator windings,
a reference flux linkage signal related to reference flux linkage of a particular order to be generated by the plural stator windings, and
an electrical angle of the electrical machine, wherein the harmonic flux controller is configured to output a reference harmonic current command of a reference harmonic current, based on the harmonic flux controller inputs, wherein based on the reference harmonic current command a reference harmonic voltage command is derivable; and
a summation system for adding, separately for a respective d-component and a respective q-component, the first voltage command and the reference harmonic voltage command to obtain a summed voltage command based on which the electrical machine is controllable;
a flux linkage calculation module adapted to calculate flux linkage components based on at least the plural stator currents and inductances of the stator windings, the inductances being calculated using a simulation of the electrical machine, the flux linkage calculation module also adapted to calculate flux linkage components based on measured or commanded machine voltages; and
a flux linkage selection module adapted to select at least one component from the flux linkage components and to derive the flux linkage signal, wherein the selection selects a d-component or a q-component of the flux linkage, wherein the flux linkage signal is determined as a root mean square of selected component(s).

2. The control arrangement according to claim 1, further comprising:
   at least one harmonic voltage calculation module configured to receive the reference harmonic current command and to output the reference harmonic voltage command based on the reference harmonic current command.

3. The control arrangement according to claim 1, wherein the harmonic flux controller comprises:
   a filter arranged to receive the flux linkage signal and the electrical angle of the electrical machine and configured to output a filtered flux linkage signal in which harmonics other than the harmonic of interest in the flux linkage signal are reduced; and
   a harmonic flux regulator arranged to output the reference harmonic current command based on the filtered flux linkage signal and the reference flux linkage signal.

4. The control arrangement according to claim 3, wherein the harmonic flux regulator comprises:
   a difference element arranged for calculating a difference between the filtered flux linkage signal and the reference flux linkage signal; and
   a regulator system configured to output the reference harmonic current command based on the difference such that when a corresponding reference harmonic current is injected into the stator winding damping of the harmonic is caused, the injection performed in at least one set of stator windings in operation, while at least one other set of stator windings is idle.

5. The control arrangement according to claim 4, wherein the regulator system comprises:
   a phase shifter configured to output a 90 degree shifted difference;
   a transformation module configured to transform the difference and the shifted difference into a rotating frame corresponding to the harmonics;
   a first PI-regulator configured to receive the transformed difference and to output a first regulator signal;
   a second PI-regulator configured to receive the transformed difference and to output a second regulator signal; and
   another transformation module configured to back-transform the first regulator signal and the second regulator signal into a rotating frame corresponding to the electrical frequency of the electrical machine, in order to obtain the reference harmonic current command.

6. The control arrangement according to claim 4, wherein the regulator system comprises:
   a first trigonometric multiplicator configured to output a first multiplied difference, being the difference multiplied by a first trigonometric multiplier depending on the harmonics;
   a first regulator configured to output a first regulator signal based on the first multiplied difference;
   a second trigonometric multiplicator configured to output a multiplied first regulator signal, being the first regulator signal multiplied by a second trigonometric multiplier depending on the harmonics;
   a third trigonometric multiplicator configured to output a third multiplied difference, being the difference multiplied by a third trigonometric multiplier depending on the harmonics;
   a second regulator configured to output a second regulator signal based on the third multiplied difference;
   a fourth trigonometric multiplicator configured to output a multiplied second regulator signal, being the second regulator signal multiplied by a fourth trigonometric multiplier depending on the harmonics; and
   a summation element configured to sum the multiplied first regulator signal and the multiplied second regulator signal and to output the sum as the reference harmonic current command.

7. The control arrangement according to the claim 4, wherein the regulator system comprises:
   a resonant regulator configured to output the reference harmonic current command based on the difference, the resonant regulator being configured to regulate the harmonic.

8. The control arrangement according to claim 2, wherein the harmonic voltage calculation module is configured to receive a q-component (Iqnref) of the reference harmonic current (Inref) being determined, using a torque ripple controller, such as to reduce torque ripple in the electrical machine.

9. The control arrangement according to claim 1, the fundamental current controller comprising:
   a positive-sequence current controller configured for providing the first voltage command in the dq+ frame, based on the plural stator currents,
   a negative-sequence current controller configured for providing a second voltage command in the dq+ frame, based on the plural stator currents,
wherein the summation system is adapted to add the first voltage command, the second voltage command, the reference harmonic voltage command and in particular a feedforward voltage signal, to obtain the summed voltage command.

10. The control arrangement according to claim 1, wherein the positive-sequence current controller comprises a frame transformation module for transforming the plural stator currents, into a current signal in a dq+ frame based on an electrical angle of the electrical machine, wherein the negative-sequence current controller comprises a frame transformation module for transforming the plural stator currents, into a current signal in a dq-frame based on a negative of an electrical angle of the electrical machine.

11. The control arrangement according to claim 1, wherein the positive-sequence current controller comprises a filter having as an input the electrical frequency of the generator, for generating a filtered dq+ current signal, in which AC-components corresponding to harmonics a multiple of electrical frequency, are reduced in amplitude, and/or wherein the negative-sequence current controller comprises another filter having as an input the electrical frequency of the generator, for generating a filtered dq− current signal, in which AC-components corresponding at multiple of electrical frequency, are reduced in amplitude, wherein a filter characteristics of the filter of the negative-sequence current controller and/or the other filter of the positive-sequence current controller is adaptable according to the electrical frequency of the generator.

12. The control arrangement according to claim 1, the fundamental current controller further comprising a voltage feedforward module for generating the feedforward voltage signal based on the positive-sequence current reference signal and the negative-sequence current reference signal and based on electrical frequency of the electrical machine.

13. A generator system, comprising:
   a generator having a rotor and at least one set of plural stator windings;

at least one converter, wherein the plural stator windings of each of the at least one set of stator windings are connected to a corresponding converter of the at least one converter;
a control arrangement according to claim 1 for each converter, connected to the corresponding converter,
wherein the generator is a variable frequency generator,
wherein the converter is a AC-DC-AC converter.

14. A wind turbine, comprising:
a rotor shaft having plural rotor blades connected thereon; and
a generator system according to claim 13, wherein the rotor of the generator system is mechanically coupled with the rotor shaft.

15. A control arrangement for controlling an electrical machine having plural stator windings separately connectable to a converter, the control arrangement comprising:
a fundamental current controller, configured for providing a first voltage command in a dq+ frame, based on plural stator currents of the plural stator windings;
the control arrangement further comprising:
at least one harmonic flux controller related to a harmonic of an electrical frequency of the electrical machine, wherein the harmonic flux controller is configured to receive as inputs:
a flux linkage signal related to flux linkages generated by the plural stator windings,
a reference flux linkage signal related to reference flux linkage of a particular order to be generated by the plural stator windings, and
an electrical angle of the electrical machine, wherein the harmonic flux controller is configured to output an reference harmonic current command of a reference harmonic current, based on the harmonic flux controller inputs, wherein based on the reference harmonic current command a reference harmonic voltage command is derivable; and
a summation system for adding, separately for a respective d-component and a respective q-component, the first voltage command and the reference harmonic voltage command to obtain a summed voltage command based on which the electrical machine is controllable; and
at least one harmonic voltage calculation module configured to receive the reference harmonic current command and to output the reference harmonic voltage command based on the reference harmonic current command.

* * * * *